United States Patent
Imazeki et al.

(10) Patent No.: US 8,768,186 B2
(45) Date of Patent: Jul. 1, 2014

(54) APPARATUS, SYSTEM, AND METHOD OF PREDICTING FAILURE OF IMAGE FORMING APPARATUS

(75) Inventors: Mikiko Imazeki, Kanagawa (JP); Yasushi Nakazato, Tokyo (JP); Osamu Satoh, Kanagawa (JP); Masahide Yamashita, Tokyo (JP); Jun Yamane, Kanagawa (JP); Kohji Ue, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 562 days.

(21) Appl. No.: 12/822,586

(22) Filed: Jun. 24, 2010

(65) Prior Publication Data

US 2011/0007337 A1 Jan. 13, 2011

(30) Foreign Application Priority Data

Jul. 10, 2009 (JP) ................. 2009-163382

(51) Int. Cl.
- G03G 15/20 (2006.01)
- G03G 15/00 (2006.01)
- G03G 21/16 (2006.01)
- G03G 15/22 (2006.01)

(52) U.S. Cl.
CPC ............ *G03G 15/20* (2013.01); *G03G 21/1647* (2013.01); *G03G 15/22* (2013.01)
USPC .............................................. 399/33; 399/36

(58) Field of Classification Search
USPC .......................................... 399/33, 16, 21, 36
See application file for complete search history.

(56) References Cited

U.S. PATENT DOCUMENTS

| | | | |
|---|---|---|---|
| 7,110,917 B2 | 9/2006 | Matsuura et al. | |
| 7,139,509 B2 | 11/2006 | Nakazato et al. | |
| 7,184,674 B2 | 2/2007 | Satoh et al. | |
| 7,203,431 B2 | 4/2007 | Shoji et al. | |
| 7,286,786 B2 | 10/2007 | Nakazato et al. | |
| 7,327,962 B2 | 2/2008 | Shoji et al. | |

(Continued)

FOREIGN PATENT DOCUMENTS

| | | |
|---|---|---|
| JP | 6-208265 | 7/1994 |
| JP | 7-196206 A | 8/1995 |

(Continued)

OTHER PUBLICATIONS

Machine translation of Maehara.*

(Continued)

*Primary Examiner* — David Gray
*Assistant Examiner* — Sevan A Aydin
(74) *Attorney, Agent, or Firm* — Oblon, Spivak, McClelland, Maier & Neustadt, L.L.P.

(57) ABSTRACT

An apparatus, system, and method of predicting failure of a fixing device of an image forming apparatus are provided. Based on a plurality of sheet transfer time values of the fixing device, a first characteristic value that is an average value of the plurality of sheet transfer time values, and at least one of a second characteristics value that indicates the variance of the plurality of sheet transfer time values and a third characteristics value that indicates the maximum value of the plurality of sheet transfer time values are calculated. Using a determination result generated based on the first characteristics value and the at least one of the second and third characteristics values, failure of the fixing device is predicted.

13 Claims, 6 Drawing Sheets

(56) References Cited

U.S. PATENT DOCUMENTS

| | | |
|---|---|---|
| 7,340,204 B2 | 3/2008 | Nakazato et al. |
| 7,382,988 B2 | 6/2008 | Nakazato |
| 7,457,550 B2 | 11/2008 | Shoji et al. |
| 7,457,562 B2 | 11/2008 | Nakazato et al. |
| 7,554,574 B2 | 6/2009 | Shoji et al. |
| 7,653,339 B2 | 1/2010 | Yamashita et al. |
| 2001/0033753 A1* | 10/2001 | Horikoshi ................. 399/16 |
| 2004/0253026 A1* | 12/2004 | Lee .......................... 399/328 |
| 2005/0050423 A1* | 3/2005 | Yasukawa et al. ........ 714/742 |
| 2005/0281596 A1 | 12/2005 | Nakagawa et al. |
| 2005/0286916 A1 | 12/2005 | Nakazato et al. |
| 2006/0294252 A1 | 12/2006 | Shoji et al. |
| 2007/0224528 A1 | 9/2007 | Yamashita et al. |
| 2008/0068639 A1 | 3/2008 | Satoh et al. |
| 2008/0075476 A1 | 3/2008 | Nakazato et al. |
| 2008/0199193 A1 | 8/2008 | Nakazato et al. |
| 2009/0033993 A1 | 2/2009 | Nakazato et al. |
| 2009/0034990 A1 | 2/2009 | Nakazato et al. |
| 2009/0052912 A1 | 2/2009 | Soji et al. |
| 2009/0060569 A1 | 3/2009 | Nakazato et al. |
| 2009/0190939 A1 | 7/2009 | Satoh et al. |
| 2009/0196634 A1 | 8/2009 | Satoh et al. |
| 2009/0319827 A1 | 12/2009 | Nakazato et al. |
| 2009/0322524 A1 | 12/2009 | Nakazato et al. |
| 2009/0324259 A1 | 12/2009 | Ue et al. |
| 2010/0094594 A1 | 4/2010 | Yamashita et al. |

FOREIGN PATENT DOCUMENTS

| | | | |
|---|---|---|---|
| JP | 2005-33559 A | | 2/2005 |
| JP | 2005-206307 A | | 8/2005 |
| JP | 2005-309077 | | 11/2005 |
| JP | 2006154153 A | * | 6/2006 |
| JP | 2008-102474 | | 5/2008 |
| JP | 2009-128636 A | | 6/2009 |

OTHER PUBLICATIONS

Cortes et al., Linear discriminant analysis versus adaboost for failure forecasting, Revista Espanola de Financiacion y Contabilidad, vol. XXXVII No. 137, pp. 13-32 (Jan. 2008).*

Translation of Shinto Euguchi, Information Geometry for Statistical Pattern Recognition: U-boost learning algorithm, Saiensu-sha Co., Ltd., Mar. 2004, pp. 1-7.*

Machine translation of Maehara, JP 2006-154153 (2006).*

Eguchi Shinto, "Information Geometry of Statistical Pattern Recognition, U Boost Learning Algorithm", Mathematical Sciences, No. 489, Mar. 2004, 8 pages (with Partial English Translation).

U.S. Appl. No. 12/818,564, filed Jun. 18, 2010, Ue, et al.

* cited by examiner

APPARATUS, SYSTEM, AND METHOD OF PREDICTING FAILURE OF IMAGE FORMING APPARATUS

CROSS-REFERENCE TO RELATED APPLICATIONS

This patent application is based on and claims priority under 35 U.S.C. §119 to Japanese Patent Application No. 2009-163382, filed on Jul. 10, 2009, in the Japanese Patent Office, the entire disclosure of which is hereby incorporated herein by reference.

FIELD OF THE INVENTION

The present invention generally relates to predicting failure of an image forming apparatus, and more specifically to predicting failure of a fixing device provided in the image forming apparatus.

BACKGROUND

An image forming apparatus such as a copier, printer, or facsimile machine includes a large number of units and components. Even if one of the units and components in the image forming apparatus fails, the image forming apparatus does not work properly and a user is not able to use the image forming apparatus until the image forming apparatus is repaired. In view of this, various techniques have been proposed to predict whether the image forming apparatus is most likely to fail in the near future and to prevent the failure beforehand by repairing or replacing the unit or component of the image forming apparatus, for example, as described in Japanese Patent Application Publication Nos. H06-208265, 2005-309077, and 2008-102474. However, none of the above-described techniques predicts failure of a fixing device of the image forming apparatus, probably due to the difficulty in specifying one or more causes contributing to failure of the fixing device.

SUMMARY

In view of the above, the inventors of the present invention have discovered that there is a technique of predicting failure of a fixing device of the image forming apparatus without requiring the complicated process, while additionally providing information that is helpful to identify one or more causes contributing to failure of the fixing device.

Example embodiments of the present invention include an apparatus, method, system, computer program and product each capable of obtaining a plurality of sheet transfer time values each indicating a time taken for a recording sheet to be transferred through a fixing device of an image forming apparatus; calculating a first characteristics value that is an average value of the plurality of sheet transfer time values, and at least one of a second characteristics value that indicates the variance of the plurality of sheet transfer time values and a third characteristics value that indicates the maximum value of the plurality of sheet transfer time values; and predicting failure of the fixing device of the image forming apparatus using a determination result generated based on the first characteristics value and the at least one of the second characteristics value and the third characteristics value, the determination result including information regarding a source of the failure that is predicted.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
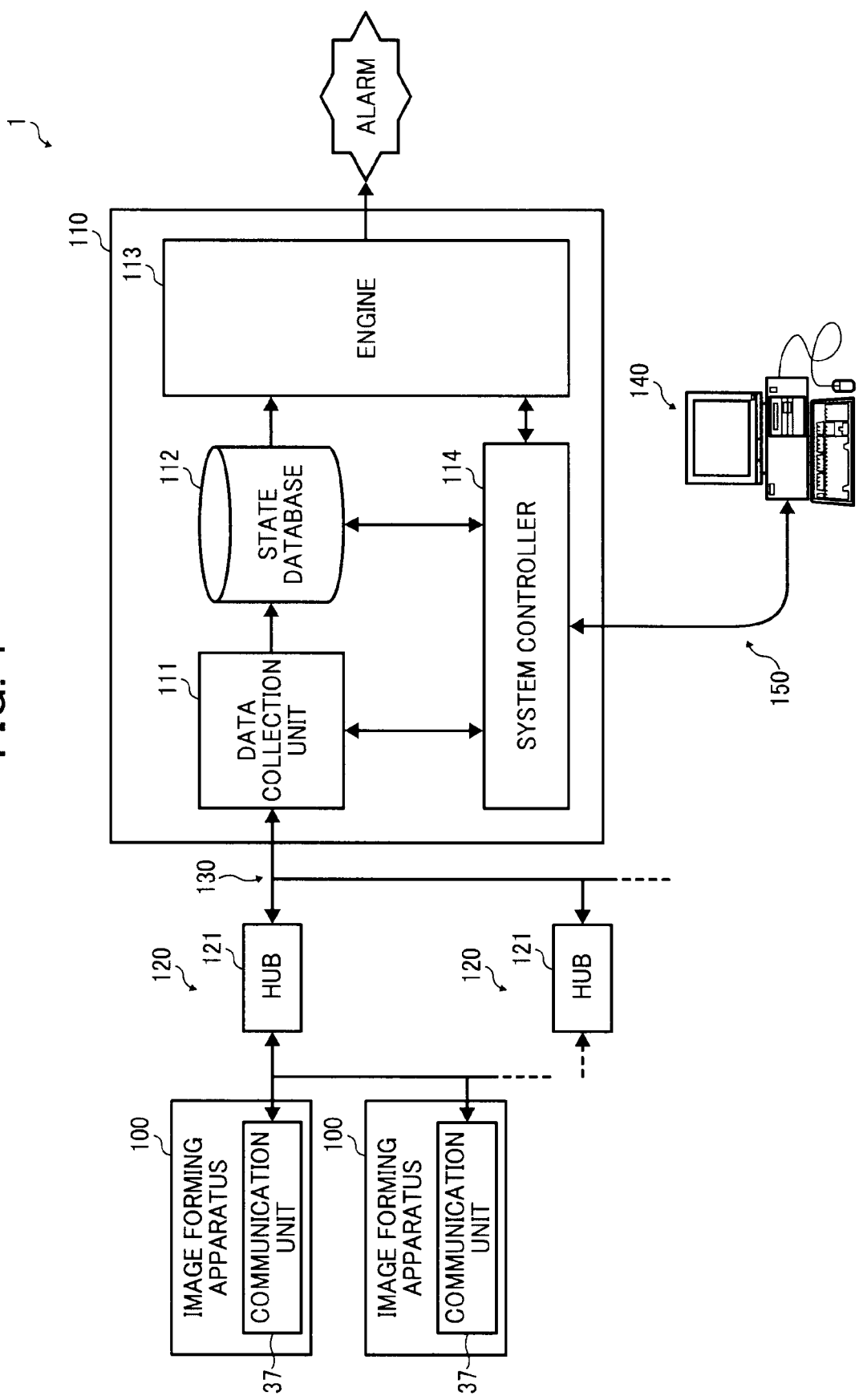
FIG. 1 is a schematic block diagram illustrating a structure of a failure prediction system including a failure prediction apparatus and an image forming apparatus, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring to FIG. 1, a structure of a failure prediction system 1 is explained according to an example embodiment of the present invention. The failure prediction system 1 includes a failure prediction apparatus 110, a plurality of image forming apparatuses 100 (collectively referred to as the image forming apparatus 100) to be analyzed by the failure prediction apparatus 110, a local are network (LAN) 120, and the Internet 130. The LAN 120, which may be any desired number of network, functions as a first network that connects at least two of the image forming apparatuses 100 that are located within a predetermined area. The Internet 130 functions as a second network that connects the failure prediction apparatus 110 to the image forming apparatus 100 via the LAN 120.

The failure prediction system 1 further includes a personal computer (PC) 140, and a local area network (LAN) 150. The PC 140 is a terminal operated by an operator, or an administrator, who performs management or maintenance of the image forming apparatus 100 through operating the failure prediction apparatus 110. The LAN 150 functions as a third network that connects the failure prediction apparatus 110 and the PC 140.

In this example, the failure prediction apparatus 110 functions as a server with respect to the PC 140. Further, the LAN 120, which is connected to the image forming apparatus 100, is connected to the Internet 130 through a hub 121. Alternatively, the image forming apparatus 100 may be connected to the failure prediction apparatus 1 directly through the Internet 130 such that the LAN 120 and the hub 121 may not be provided. Alternatively, the image forming apparatus 100 may be connected to the failure prediction apparatus 110 directly through a cable such that the Internet 130 does not have to be provided. Further, the LAN 120 and the LAN 150 may be implemented as a single network.

Figure 2:
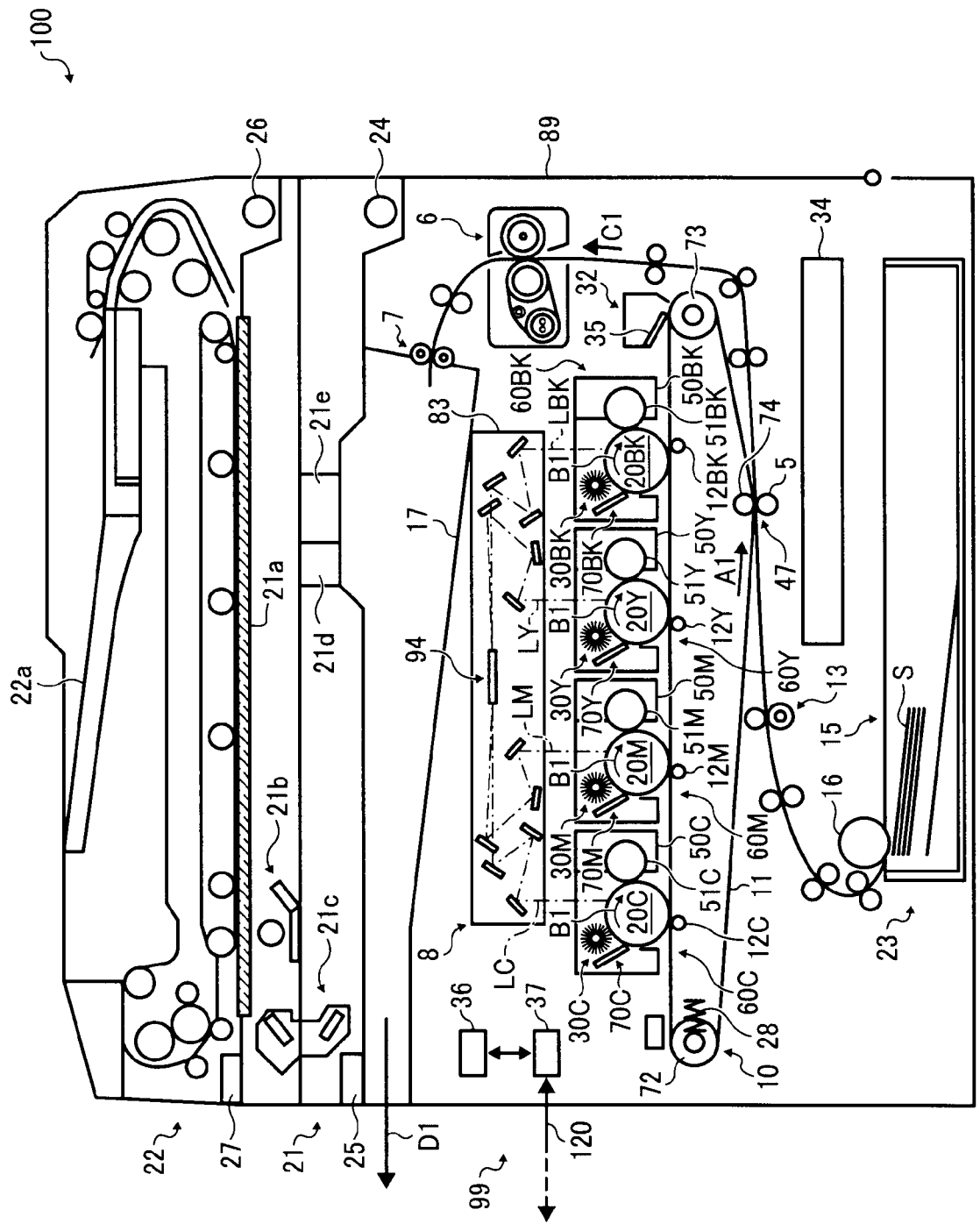
FIG. 2 is a schematic block diagram illustrating a cross-sectional diagram of the image forming apparatus of FIG. 1.

FIG. 2 is a schematic diagram illustrating a cross-sectional view of a structure of the image forming apparatus 100. The image forming apparatus 100 is implemented as a multifunctional apparatus (MFP) capable of functioning as a copier, printer, or facsimile to form a full color image. When the image forming apparatus 100 functions as the printer or facsimile, the image forming apparatus 100 forms an image according to an image signal generated based on image information received from the outside such as through the LAN 120 or a telephone network.

The image forming apparatus 100 forms an image on a recording medium. The examples of recording medium include, but not limited to, a recording sheet such as paper, OHP sheet, thin paper, thick paper such as a post card, and envelop. For the descriptive purpose, any desired recording medium is referred to as a recording sheet.

In this example, the image forming apparatus 100 is a color image forming apparatus of tandem type that is provided with a plurality of photoconductive drums 20BK, 20Y, 20M, and 20C each having a cylindrical shape and are arranged side by side. The photoconductive drums 20BK, 20Y, 20M, and 20C, each functioning as an image carrier, respectively form the images of black, yellow, magenta, and cyan thereon. The image forming apparatus 100 includes a body section ("body") 99, a reading device 21 provided above the body 99, an automatic document feeder (ADF) 22 provided above the reading device 21, and a sheet feeding device 23 that is provided below the body 99.

The photoconductive drums 20BK, 20Y, 20M, and 20C are equal in radius. The image forming apparatus 100 further includes an intermediate transfer body such as an intermediate transfer belt ("transfer belt") 11 of endless belt, which is provided at a central section of the body 99 of the image forming apparatus 100. The photoconductive drums 20BK, 20Y, 20M, and 20C are arranged along an outer surface of the transfer belt 11 so as to keep a predetermined distance from each other. The transfer belt 11 is transferred in a direction indicated by the arrow A1 along the photoconductive drums 20BK, 20Y, 20M, and 20C.

The photoconductive drums 20BK, 20Y, 20M, and 20C are arranged in this order from upstream in the direction of A1. As illustrated in FIG. 2, the photoconductive drums 20BK, 20Y, 20M, and 20C are respectively provided within image forming stations 60BK, 60Y, 60M, and 60C. The image forming stations 60BK, 60Y, 60M, and 60C respectively form the images of black, yellow, magenta, and cyan on the surfaces of the photoconductive drums 20BK, 20Y, 20M, and 20C.

The visually formed images, such as toner images, formed on the photoconductive drums 20BK, 20Y, 20M, and 20C, are superimposed one above the other on the transfer belt 11 that is transferred in the direction A1 to form a full-color image on the surface of the transfer belt 11. The full-color image formed on the transfer belt 11 is then transferred onto a recording sheet S fed from the sheet feeding device 23.

The image forming apparatus 100 includes a transfer belt unit 10 having a plurality of primary transfer rollers 12BK, 12Y, 12M, and 12C, in addition to the transfer belt 11. The primary transfer rollers 12BK, 12Y, 12M, and 12C are respectively provided at the primary transfer positions facing the photoconductive drums 20BK, 20Y, 20M, and 20C via the transfer belt 11. In order to transfer the toner images respectively formed on the photoconductive drums 20BK, 20Y, 20M, and 20C at the same position of the transfer belt 11 as the transfer belt 11 is transferred in the direction A1, the primary transfer rollers 12BK, 12Y, 12M, and 12C respectively functioning as transfer chargers are controlled such that the time for applying electric voltage are different among the primary transfer rollers 12BK, 12Y, 12M, and 12C. In this manner, the images formed on the photoconductive drums 20BK, 20Y, 20M, and 20C are respectively transferred at the primary transfer positions.

The image forming apparatus 100 further includes a secondary transfer device 47 that transfers the toner image formed on and transferred with the transfer belt 11 to the recording sheet S fed from the sheet feeding device 23. More specifically, the second transfer device 47 is provided with a secondary transfer roller 5 that forms a nip portion with a transfer entry roller 74 at which the full-color image is transferred from the transfer belt. The nip portion formed by the secondary transfer roller 5 and the transfer entry roller 74 is referred to as a secondary transfer position.

The reading device 21 is a scanner that reads an original into image data. The ADF 22 feeds the original placed thereon toward the reading device 21. The sheet feeding device 23 stores therein a stack of recording sheets S, and feeds the recording sheet S, from the sheet feeding device 23 toward the secondary transfer position.

The image forming apparatus 100 further includes a cleaning device 32 that is provided at a position between the secondary transfer device 47 and the image forming station 60BK so as to face the transfer belt 11 to remove residual toner that resides on the transfer belt 11 after the full-color image is transferred at the secondary transfer position. The image forming apparatus 100 further includes a discharged toner storage device 34 below the secondary transfer device 47 at a position facing the secondary transfer device 47. The cleaning device 32 and the discharged toner storage device 34 are connected through a discharged toner passage such that the toner collected by the cleaning device 32 is transferred to and stored in the discharged toner storage device 34.

The image forming apparatus 100 further includes an optical scanning device 8 that is arranged above the image forming stations 60BK, 60Y, 60M, and 60C. The optical scanning device 8 forms latent images on the surfaces of the photoconductive drums 20BK, 20Y, 20M, and 20C.

The image forming apparatus 100 further includes a registration roller pair 13 that transfers the recording sheet S fed from the sheet feeding device 23 to the secondary transfer position at a predetermined timing such that the full-color image formed on the transfer belt 11 is transferred onto the recording sheet S at the secondary transfer position. The image forming apparatus 100 further includes a sensor that detects whether a leading edge of the recording sheet S reaches the registration roller pair 13.

The image forming apparatus further includes a fixing device 6 that fixes the toner image onto the recording sheet S that is transferred from the secondary transfer position in the direction indicated by the arrow C1.

The recording sheet S that is transferred through the fixing device 6 is transferred to and discharged by a discharge roller pair 7 to the outside of the body 99 onto a discharge tray 17. The discharge tray 17 is provided above the body 99 to mount the recording sheet S output by the discharge roller pair 7 thereon. The image forming apparatus 100 further includes a plurality of toner bottles respectively storing therein black toner, yellow toner, magenta toner, and cyan toner.

Further, the image forming apparatus 100 is provided with a side door 89 that may be opened to expose the inside of the body 99 or closed to cover the inside of the body 99, at a position facing the fixing device 6.

Figure 3:
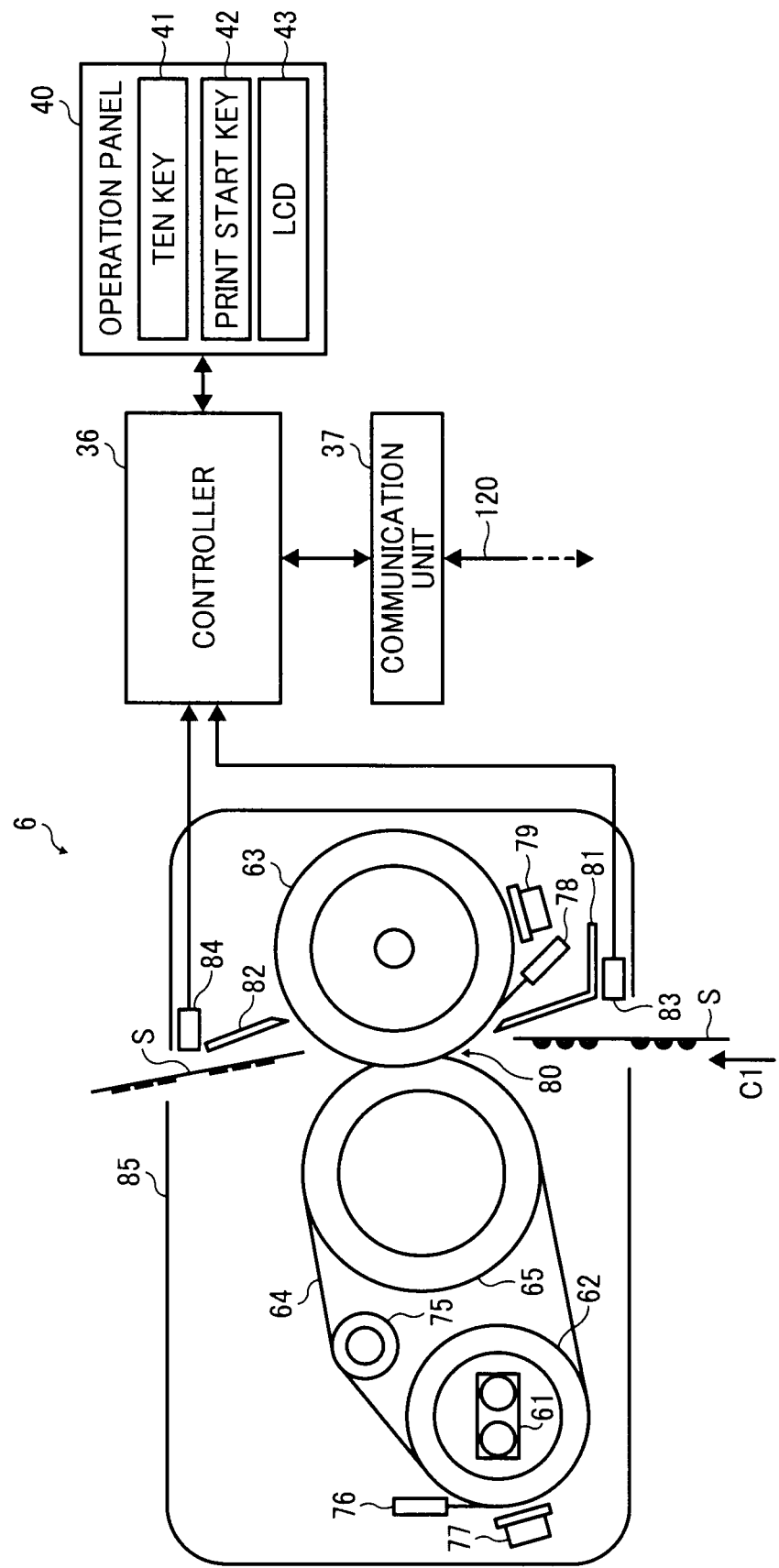
FIG. 3 is a selected portion of the failure prediction system of FIG. 1 that includes a fixing device of the image forming apparatus of FIG. 1.

As illustrated in FIGS. 1 to 3, the image forming apparatus 100 further includes a controller 36 that controls operation of the image forming apparatus 100, a communication unit 37, and an operation panel 40. The communication unit 37 communicates with the outside apparatus such as the failure prediction apparatus 110 through the LAN 120 under control by the controller 36. The operation panel 40 allows a user to input various instructions to the image forming apparatus 100.

Referring back to FIG. 2, the image forming apparatus 100 is an inner-body discharge type image forming apparatus having the discharge tray 17 provided above the body 99 and below the reading device 21. The recording sheet S mounted on the discharge tray 17 may be taken out by a user by pulling the recording sheet S in the direction D1.

The transfer belt unit 10 includes, in addition to the transfer belt 11 and the plurality of primary transfer rollers 12BK, 12Y, 12M, and 12C, a tension roller 72 wound around the transfer belt 11, a cleaning roller 73, the transfer entry roller 74, a spring 28, and a pair of intermediate transfer unit side plates (not shown). The cleaning roller 73, which functions as a driver roller that drives the transfer belt 11, is provided at a position that faces the cleaning device 32 via the transfer belt 11. The transfer entry roller 74, which is a driven roller that stretches the transfer belt 11, is provided at the position that faces the secondary transfer roller 5 via the transfer belt 11. The spring 28 applies pressure to the tension roller 72 in a direction away from the cleaning roller 73. The tension roller 72 is provided to stretch the transfer belt 11. The intermediate transfer unit side plates are provided so as to sandwich the transfer belt 11 while rotatably supporting the cleaning roller 73 and the first transfer roller 74 at the respective sides.

The secondary transfer device 47 includes, in addition to the secondary transfer roller 5, a high voltage electric supply. The secondary transfer roller 5 functions as a transfer member that rotates in the same direction as the transfer belt 11 at a position contacting the transfer belt 11. The high voltage electric supply is connected to the secondary transfer roller 5 and applies secondary transfer bias to the transfer belt 11 via the secondary transfer roller 5 to cause the toner image formed on the transfer belt 11 to be transferred to the recording sheet S. The bias voltage to be applied by the high voltage electric supply is controlled by the controller 36 of FIG. 3.

The secondary transfer roller 5 is provided at the position facing the transfer entry roller 74 via the transfer belt 11 to form the secondary transfer position. The secondary transfer roller 5 is made of a core metal formed of such as SUS, which is covered by elastic body made of Urethane having a predetermined resistivity that is controlled by conductive material.

The cleaning device 32 includes an intermediate transfer cleaning blade 35, which is made in contact with the transfer belt 11 at a position facing the first transfer roller 73. The intermediate transfer cleaning blade 35 removes unwanted material such as residual toner or paper powder from the surface of the transfer belt 11 to keep the surface of the transfer belt 11 clean.

The unwanted material such as the residual toner removed by the intermediate transfer cleaning blade 35 is transferred through the discharged toner passage to the discharged toner storage 34. The portion of the intermediate transfer cleaning blade 35 that is made in contact with the transfer belt 11, which is called a cleaning nip portion, and/or an edge portion of the intermediate transfer cleaning blade 35 is previously applied with an applying agent such as lubricant, toner, or zinc stearate. With this applying agent, which may be applied at the time of installation, the cleaning nip portion is prevented from being curved. Further, since a layer is formed at the cleaning nip portion, the cleaning capability increases.

The optical scanning device 8 is implemented by a laser beam scanner 83 provided with a light source 94 such as a laser diode. The optical scanning device 8 scans laser light beams LBK, LY, LM, and LC onto the respective surfaces of the photoconductive drums 20BK, 20Y, 20M, and 20C to form latent images thereon. The light source may be alternatively implemented by LED.

The optical scanning device 8 may be taken out from the body 99. When it is removed, the process cartridges respectively installed onto the image forming stations 60BK, 60Y, 60M, and 60C may be each pulled out in the direction upward from the body 99.

The sheet feeding device 23 includes a sheet feeding tray 15 having a stack of recording sheets S therein, and a sheet feeding roller 16 that feeds the recording sheet S from the sheet feeding tray 15.

The reading device 21 is made integral with the body 99 by a rotational shaft 24 that is provided at the position close to the back side of the image forming apparatus 100 away from the direction D1. Around the rotational shaft 24, the reading device 21 is opened or closed with respect to the body 99.

Further, the reading device 21 is provided with a holder 25 that is provided at an edge portion. With the holder 25, the user is able to easily open the reading device 21 with respect to the body 99. When the reading device 21 is opened, an angle between the surface of the reading device 21 and the surface of the body 99 is about 90 degrees. Since the inside of the body 99 is exposed, the user is able to easily check the inside of the body 99.

The reading device 21 includes an exposure glass 21a, a first scanning body 21b including a light source and a light reflector, a second scanning body 21c including a second reflector, an imaging lens 21d, a reading sensor 21e, etc. The exposure glass 21 holds an original to be read thereon. The light source irradiates light to the original placed on the exposure glass 21a. The first reflector reflects the light irradiated by the light source. Since the first scanning body 21b moves in a direction along horizontal directions of FIG. 2, the light irradiated by the light source is scanned through the entire surface of the original. The second reflector reflects the light reflected by the first reflector toward the imaging lens 21d. The imaging lens 21d collects the light received from the second scanning body 21c onto the surface of the reading sensor 21e. The reading sensor 21e converts the light received from the imaging lens 21d into image data of the original.

The ADF 22 is made integral with the reading device 21 by a rotational shaft 26 that is provided at the position close to the back side of the image forming apparatus 100 away from the direction D1. Around the rotational shaft 26, the ADF 22 is opened or closed with respect to the reading device 21.

Further, the ADF 22 is provided with a holder 27 that is provided at an edge portion. With the holder 27, the user is able to easily open the ADF 22. When the ADF 22 is opened, the surface of the exposure glass 21a of the reading device 21 is exposed.

The ADF 22 includes an original table 22a, and a driving unit including a motor that feeds the original placed on the original table 22a. In order to copy the original, the original may be placed on the original table 22a of the ADF 22 or placed on the exposure glass 21a of the reading device 21. When placing the original onto the exposure glass 21a, the ADF 22 is closed such that the original is pressure contacted with the surface of the exposure glass 21a. When the ADF 22 is opened, an angle between the lower surface of the ADF 22 and the upper surface of the image reading device 21 is about 90 degrees. Accordingly, the user is able to easily place or remove the original onto or from the exposure glass 21a or clean the exposure glass 21a as needed.

Referring to FIG. 3, the fixing device 6 of the image forming apparatus 100 includes a heating roller heater 61 functioning as a heat source, a heating roller 62 having the heating roller heater 61 in its inside, a fixing roller 65, a fixing belt 64 wound around the heating roller 62 and the fixing roller 65, and a pressure roller 63 that is made in contact with the fixing roller 65 to form a fixing nip portion 80 with the fixing roller 65.

The fixing device 6 further includes a supplementary roller 75 around which the fixing belt 64 is wound, a first thermistor 76 and a first thermostat 77 respectively detecting a temperature of the fixing belt 64 at a portion where the heating roller 62 is wound around, and a second thermistor 78 and a second thermostat 79 respectively detecting a temperature of the pressure roller 63 at a portion upstream of the fixing nip portion 80 in the rotational direction of the pressure roller 63.

The fixing device 6 further includes an entry guide plate 81 that is provided upstream of the fixing nip portion 80 in the direction C1 to guide the recording sheet S into the fixing nip portion 80, and an exit guide plate 82 that is provided downstream of the fixing nip portion 80 in the direction C1 to guide the recording sheet S that passes the fixing nip portion 80 to the outside of the fixing device 6.

The fixing device 6 further includes a fixing entry sensor 83 and a fixing exit sensor 84. The fixing entry sensor 83 detects a leading edge of the recording sheet S that is guided by the entry guide plate 81 as it enters inside the fixing device 6. The fixing exit sensor 84 detects a leading edge of the recoding sheet S that is guided by the exit guide plate 82 as it passes the fixing nip portion 80 toward the outside of the fixing device 6. Further, a fixing drive gear is provided at a position facing the body 99 to rotatably drive the heating roller 62, the pressure roller 63, the fixing belt 64, the fixing roller 65, and the supplementary roller 75. Further, as illustrated in FIG. 3, a fixing case 85 accommodates therein the above-described structures of the fixing device 6 except for the fixing drive gear.

The fixing case 85, which may be referred to as a fixing unit 85, is freely attached to or detached from the body 99. When the side plate 89 is opened, the fixing device 6 is exposed outside of the body 99 such that the fixing unit 85 is easily uninstalled from the body 99. With this structure, the fixing unit 85 is easily replaced or maintained while the fixing unit 85 is being removed from the body 99. When the fixing unit 85 is removed from the body 99, the fixing drive gear that is remained in the body 99 is also exposed toward the outside of the body 99 such that the fixing drive gear is easily accessed for replacement or maintenance.

The fixing entry sensor 83 and the fixing exit sensor 84 are each implemented by a reflective photo-interrupter that detects a leading edge of the recording sheet S as it passes by detecting a reflective light reflected from the recording sheet S. The fixing entry sensor 83 and the fixing exit sensor 84 respectively output the detection signals indicating whether the recording sheet S is detected to the controller 36.

The first thermistor 76, the first thermostat 77, the second thermistor 78, and the second thermostat 79 are respectively used to keep the fixing temperature of the fixing nip portion 80 to a predetermined fixing temperature. The detected fixing temperature is used to control operation of controlling the heating roller heater 61.

In the fixing device 6, as the recording sheet S having the toner image formed thereon is transferred through the fixing nip portion 80, the toner image is fixed onto the surface of the recording sheet S by heat and pressure.

The fixing device 6 changes the processing speed of the fixing device 6 according to the type of the recording sheet S, by controlling the rotational speed of any one of the fixing roller 62, the pressure roller 63, the fixing belt 64, the fixing roller 65, and the supplementary roller 75. More specifically, when the thickness of the recording sheet S is greater than a predetermined threshold, the controller 36 controls the processing speed of the fixing device 6 to be slower. In this manner, the recording sheet S that is thick is transferred through the fixing nip portion 80 with more time such that the toner image is tightly fixed onto the thick recording sheet.

The controller 36 includes a central processing unit (CPU) and a memory including a read only memory (ROM) and a random access memory (RAM). The ROM stores therein various operation control programs and control data used by operation control programs. The RAM stores data used by the controller 36 to operate the image forming apparatus 100.

The CPU of the controller 36 obtains the difference between a time when the signal output by the fixing entry sensor 83 is received and a time when the signal output by the fixing exit sensor 84 is received, and calculates a time period counted from the time when the leading edge of the recording sheet S is detected by the fixing entry sensor 83 to the time when the leading edge of the recoding sheet S is detected by the fixing exit sensor 84 as a sheet transfer time value indicating time taken for a recording sheet S to be transferred or conveyed through the fixing device 6. The sheet transfer time value may be alternatively referred to as a sheet conveyance time value. The calculated sheet transfer time value is stored in the RAM.

When an accumulated number of recording sheets formed with images reaches a threshold, the controller 36 activates the communication unit 37, for example, at the time of applying an operation voltage or completing image forming operation. After the communication unit 37 is activated, the controller 36 sends a communication request to the failure prediction apparatus 110 such that the image forming apparatus 100 is able to send information such as information regarding the sheet transfer time value stored in the RAM together with identification information of the image forming apparatus 100.

The operation panel 40 includes a ten key 41 that allows the user to specify a number of copies, for example, a print start key 42 that allows the user to instruct starting of image forming operation, and a liquid crystal display (LCD) 43 that displays information such as the status of the image forming apparatus 100 to the user.

Referring now to FIG. 2, a structure of the image forming station 60 is explained while taking the image forming station 60BK as an example.

The image forming station 60BK provided with the photoconductive drum 20BK includes the primary transfer roller 12BK, a cleaning unit 70BK, a charger unit 30BK, and a developer unit 50BK, which are arranged in a circumferential direction of the photoconductive drum 20BK in the rotational direction B1 of the photoconductive drum 20BK. The cleaning unit 70BK cleans the surface of the photoconductive drum 20BK. The charger unit 30BK charges the surface of the photoconductive drum 20BK with high voltage. The developer unit 50BK develops the latent image formed on the surface of the photoconductive drum 20BK into toner image.

The photoconductive drum 20BK, the cleaning unit 70BK, the charger unit 30BK, and the developer unit 50BK are integrally provided to form a process cartridge. The process cartridge is freely installed or uninstalled onto or from the body 99. With this structure, the process cartridge is easily replaced or removed for maintenance.

The photoconductive drum 20BK is rotatably driven at about the rotational speed of 120 mm/s. The charger unit 30BK is provided with a brush roller, and a high voltage power supply that applies a bias to the brush roller. The brush roller is made in contact with the surface of the photoconductive drum 20BK and rotates with the rotation of the photoconductive drum 20BK. The high voltage power supply applies a bias generated by superimposing AC on DC to the brush roller. Alternatively, the DC bias may be applied. The charger unit 30BK uniformly charges the surface of the photoconductive drum 20BK at −500V.

The developer unit 50BK includes a developing roller 51BK that is provided at a position facing the photoconductive drum 20BK, a developing roller drive motor functioning as a drive source that rotatably drives the developing roller 51BK, and a high voltage power supply that supplies a developing bias to the developing roller 51 BK.

The developing roller 51BK has a diameter of 12 mm, and is rotated at the leaner speed of 160 mm/s by the drive roller motor under control of the controller 36. In this example, the developer unit 50BK develops the image using toner of a single component contact type. Further, a developing agent having charging characteristics of negative polarity is used. The developing unit 50BK is previously installed with toner of 180 g.

In operation of forming a full-color image, when the print start key 42 of the operation panel 40 is pressed, the photoconductive drum 20BK is rotated in the direction B1 and uniformly charged by the charger unit 30BK. The optical scanning device 8 forms a latent image on the charged surface of the photoconductive drum 20BK based on the light beam LBK, which is generated according to image data of black color. In order to form the latent image, the laser beam LBK is scanned in the main scanning direction, and the sub-scanning direction due to the rotation of the photoconductive drum 20BK in the direction B1. The sub-scanning direction is a circumferential direction of the photoconductive drum 20BK.

The developer unit 50BK applies charged black color toner to the latent image to form a black toner image. The toner image formed on the surface of the photoconductive drum 20BK is transferred by the primary transfer roller 12BK onto the transfer belt 11 that is moved in the direction A1. The cleaning device 70BK removes residual toner from the surface of the photoconductive drum 20BK.

The toner images of other colors are respectively formed on the photoconductive drums 20Y, 20M, and 20C, in a substantially similar manner, and transferred onto the surface of the transfer belt 11 by the primary transfer rollers 12Y, 12M, and 12C to form a full-color composite image.

The full-color toner image formed on the transfer belt 11 is transferred to the secondary transfer position at which the secondary transfer roller 5 is provided, together with the rotation of the transfer belt 11 in the direction A1. Under control of the controller 36, a predetermined value of the secondary transfer bias is applied by the secondary transfer device 47 to transfer the full-color image from the transfer belt 11 to the recording sheet S at the secondary transfer position.

Before being transferred through the secondary transfer position formed between the transfer belt 11 and the secondary transfer roller 5, the recording sheet S, which is fed by the sheet feeding device 23, is controlled to be transferred by the registration roller pair 13 based on a detection signal output by a sensor at a timing such that the leading edge of the full-color image formed on the transfer belt 11 is transferred to the recording sheet S at the secondary transfer position.

The recording sheet S having the full-color image formed thereon is separated from the transfer belt 11 by a curvature surface of the transfer entry roller 74, and is transferred to the fixing device 6 in the direction C1. As the recording sheet S is transferred through the fixing nip portion 80, the full-color image formed on the recording sheet S is fixed onto the recording sheet S by heat and pressure.

The recording sheet S after passing the fixing device 6 is transferred through the discharge roller pair 7, and output onto the discharge tray 17. The transfer belt 11 after secondary transfer is cleaned by the cleaning device 32.

In this example, the failure prediction apparatus 110 predicts failure of the fixing device 6 of the image forming apparatus 100. More specifically, the failure prediction apparatus 100 predicts whether the fixing device 6 is currently failure state or whether the fixing device 6 is most likely to fail in the near future. Referring now to FIG. 1, a structure of the failure prediction apparatus 110 is explained.

The failure prediction apparatus 100 includes a data collection unit 111, a state database 112, an engine 113, and a system controller 114. The data collection unit 111 receives information regarding the image forming apparatus 100 through the LAN 120 and the Internet 130, such as information regarding the sheet transfer time value that is obtained, stored, and sent by the controller 36 of the image forming apparatus 100. In this example, it is assumed that the failure prediction apparatus 110 collects a plurality of sheet transfer time values of the fixing device 60 of the image forming apparatus 100 as the sheet transfer time information. The state database 112, which is implemented by a memory, stores data collected by the data collection unit 111 such as the sheet transfer time information. The engine 113 determines a state of the fixing device 6 of the image forming apparatus 100 based on the sheet transfer time information stored in the state database 112 to generate a determination result indicating whether the fixing device 6 fails or is most likely to fail in the near future. The system controller 114 controls the data collection unit 111, the state database 121, and the engine 113. The system controller 14 is connected to the PC 140 through the LAN 150.

The data collection unit 111 is provided with a function of communicating with the image forming apparatus 100 to collect the sheet transfer time information from the image forming apparatus 100. More specifically, the data collection unit 111 receives a communication request from the image forming apparatus 100 that is generated when the controller 36 of the image forming apparatus 100 determines that it is necessary to send the sheet transfer time information of the fixing device 60. When the communication request is received, the data collection unit 111 sends an instruction to the image forming apparatus 100 to send the sheet transfer time information of the fixing device 60 to receive the plurality of sheet transfer time values of the image forming apparatus 100 as batch data.

The state database 112 stores the sheet transfer time information of the fixing device 60 in a memory. The examples of memory include, but not limited to, a semiconductor memory such as ROM or nonvolatile memory, optical memory such as DVD, MO, MD, or CD-R, and magnetic memory such as hard disk, magnetic tape, flexible disk, etc. The state database 112 stores the plurality of sheet transfer time values received by the data collection unit 111 as one file in association with the identification information of the image forming apparatus 100.

The engine 113 is provided with a CPU to carry out calculation. As described below, the engine 113 functions as a first characteristics value calculator that calculates a first characteristics value based on the sheet transfer time information, a second characteristics value calculator that calculates a second characteristics value based on the sheet transfer time information, and a third characteristics value calculator that calculates a third characteristics value based on the sheet transfer time information.

The engine 113 functions as a state determiner that determines whether the fixing device 6 of the image forming apparatus 100 fails or is most likely to fail in the near future based on a desired combination of the first, second, and third characteristics values.

More specifically, in the following example, the engine 113 functions as a pre-determination result calculator that obtains a pre-determination result indicating whether there is any probability that the fixing device 6 fails or is most likely to fail, which is used for determination of whether the fixing device 6 is the failure state. For example, the pre-determination result may be generated by using a function of the engine 113 as a weak learner or classifier.

Further, the engine 113 functions as a determination index value calculator that obtains a determination index value indicating whether the fixing device 6 is failure state based on the pre-determination result. For example, the determination index value may be generated by using a function of the engine 113 as a majority rule calculator or a majority rule processor.

When the engine 113 determines that the fixing device 6 of the image forming apparatus 100 fails based on the determination index value, the engine 113 sends notification to a specific user such as a service engineer at the PC 104, for example, by sending an email addressed to an email address of the service engineer. In this manner, the specific user is able to recognize that the fixing device 6 of the image forming apparatus 100 fails or is most likely to fail. For example, the engine 113 may send notification to the PC 140 through the LAN 150 to display an alert message on a display of the PC 140. Accordingly, the engine 113 functions as an alarm generator.

The system controller 114 includes a CPU that controls operation of the failure prediction apparatus 110, and a memory storing various data to be used for controlling operation. The memory includes a first memory such as a ROM storing therein operation programs or data needed for such operation programs, and a second memory such as a RAM storing data needed for operation of the failure prediction apparatus 110. More specifically, in this example, the CPU loads a failure prediction control program stored in the ROM onto the RAM to cause the failure prediction apparatus 110 to perform operation of predicting failure of the fixing device 6 of the image forming apparatus 100.

Figure 6:
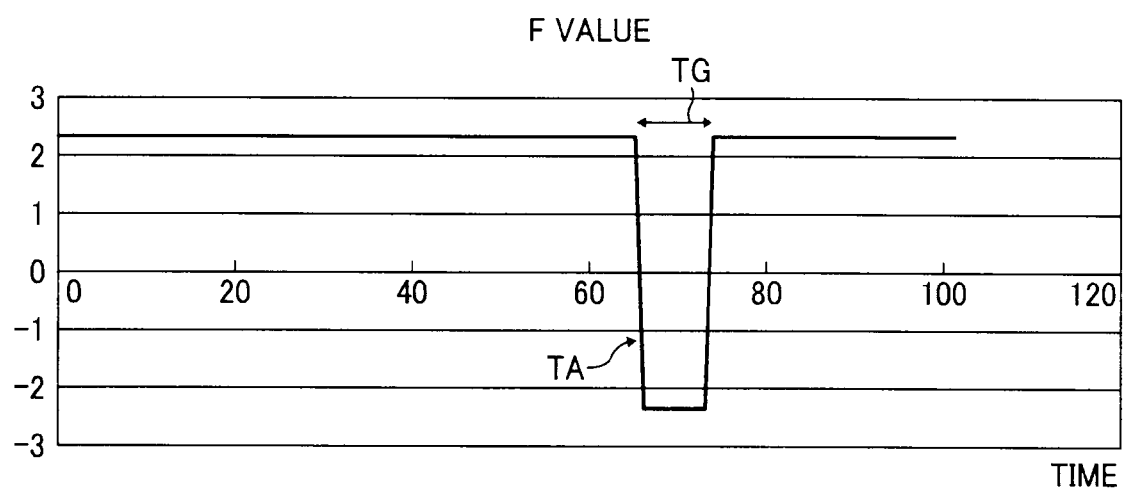
FIG. 6 is an illustration of the correlation between a determination index value calculated by the failure prediction apparatus of FIG. 1 using a test condition data set and an occurrence of failure predicted in the image forming apparatus of FIG. 1.

Referring to FIGS. 1 and 6, operation of predicting failure of the fixing device 6 of the image forming apparatus 100, performed by the failure prediction apparatus 110, is explained.

In this example, the failure prediction apparatus 110 determines that the fixing device 6 fails or is most likely to fail in the near future when the data obtained from the image forming apparatus 100 shows a trend that is different from the general trend. Specifically, in this example, the failure prediction apparatus 110 uses the first characteristics value, second characteristics value, and third characteristics value, which are respectively calculated by the engine 113 based on the sheet transfer time information to determine whether the fixing device 60 fails or is most likely to fail.

The first characteristics value is an average value of the plurality of sheet transfer time values of the fixing device 6 of the image forming apparatus 100 that is stored in the state database 112. The first characteristics value may be referred to as the average sheet transfer time value.

The second characteristics value is a standard deviation obtained from the plurality of sheet transfer time values of the fixing device 6 of the image forming apparatus 100 that is stored in the state database 112, which is calculated by the engine 113 as information indicating the variance of the plurality of sheet transfer time values. Alternatively, any desired information may be obtained as long as it indicates the variance of the plurality of sheet transfer time values, for example, such as information indicating the distribution of the plurality of sheet transfer time values.

The third characteristics value is the largest or maximum value of the plurality of sheet transfer time values of the fixing device 6 of the image forming apparatus 100 that is stored in the state database 112, which is selected by the engine 113 as information indicating a maxim delay time. For the descriptive purpose, the third characteristics value is referred to as the maximum delay time.

Assuming that the first to third characteristics values are calculated based on the same data set of the plurality of sheet transfer time values, the first to third characteristics values obtained for a certain time period are collectively referred to as a condition data set C of the fixing device 6 of the image forming apparatus 100. The condition data set C may be obtained for different times using more than one data set of plurality of sheet transfer time values that are obtained at different times. Accordingly, a time series of condition data sets C1 to Cn is generated, with n reflecting the different data set or the different time at which the data is obtained. The condition data sets C1 to Cn show how the condition data set C of the fixing device 6 of the image forming apparatus 100, each of which includes the first to third characteristics values, changes over time. Further, such condition data sets C1 to Cn are prepared for each one of the image forming apparatuses 100 managed by the failure prediction apparatus 110.

Using the condition data sets C1 to Cn, which may be collectively referred to as the condition data set Ci, the engine 113 of the failure prediction apparatus 110 determines whether there is a possibility that the fixing device 6 of the image forming apparatus 100 fails or is most likely to fail in the near future. According, the engine 113 is provided with a function of determining a state of the fixing device 6 of the image forming apparatus 100.

More specifically, the engine 113 determines whether each one of the first to third characteristics values of the condition data set Ci reflects normal fixing operation of the fixing device 6 based on the following formula 1.

$$\text{Out}i = 1 (sgni*(Ci-bi) \geq 0)$$

$$\text{Out}i = -1 (sgni*(Ci-bi) < 0)$$

The engine 113 assigns a different value of Outi, either 1 or −1, depending on whether each characteristics value of the condition data set Ci indicates normal fixing operation. In the formula 1, i is any number that ranges from 1 to n. The value bi and the value sgni are respectively obtained using Boosting algorithm, while bi is a threshold regarding each characteristics value of the condition data set Ci, and sgni is a determination polarity regarding each characteristics value of the condition data set Ci. Using the above-described formula 1, the engine 113 generates a determination result for each of the condition data sets C1 to Cn.

In this example, the determination result, such as the value of Outi, generated by the engine 113 as described above is only used as one of the factors contributing determination of whether the fixing device 6 of the image forming apparatus 100 fails or is most likely to fail. For the descriptive purpose, the determination result, such as the value of Outi, generated by the engine 113 is referred to as a pre-determination result. The function of the engine 113 that generates the pre-determination result is thus treated as a weak learner. Accordingly, the engine 113 functions as a pre-determination result calculator, a weak determination result processor, a weak learner, or a weak classifier.

The engine 113 further determines whether the fixing device 6 of the image forming apparatus 100 is in normal state or failure state using the pre-determination result, or the Outi value calculated using the formula 1, based on the following formula 2. More specifically, the engine 113 calculates a determination index value F, which it obtained as a weighted majority rule determination result using the weighted majority rule indicated by the following formula 2. When the determination index value F is equal to or less than 0, it is determined that the fixing device 6 is in a failure state.

$$Fi = \Sigma(i=1,n)(\alpha i * \text{Out}i), \text{ wherein } i \text{ ranges between 1 and } n.$$

The value $\alpha i$ indicates a weighted value of the value Outi, which is the pre-determination result generated by the weak learner function of the engine 113. As indicated by the formula 1 and 2, the value $\alpha i$ is multiplied with each of the first to third characteristics values of the condition data set Ci to generate weighted value ($\alpha i * \text{Out}i$). The weighted values of the condition data set Ci are added together to calculate the determination index value F. Accordingly, the engine 113 functions as a weighted majority rule calculator or a determination index value calculator.

With the function of weak learner, the engine 113 is able to perform calculation with high processing speed. With the function of weighted majority rule processor, the engine 113 is able to output a determination result, which is the determination index value, with improved accuracy. Since the engine 113 is provided with the weak learner function and the majority rule processor function, failure prediction is achieved with improved accuracy and with less cost.

The coefficients bi, sgni, and $\alpha i$ are respectively obtained using Boosting algorithm. Boosting is a machine learning algorithm that performs supervised learning. More specifically, a condition data set C indicating a normal state of the fixing device 6 of the image forming apparatus 100 and a condition data set C indicating a failure state of the fixing device 6 of the image forming apparatus 10 are generated. In order to obtain the condition data sets, test images are sequentially printed using a test image forming apparatus having the same type of the image forming apparatus 100 of FIG. 2. While performing printing operations, the test image forming apparatus obtains and stores a plurality of sheet transfer time values. Since the value of sheet transfer time varies depending on a type of the recording sheet to be processed, a plurality of types of recording sheets such as paper of different thickness are processed.

In this example, the damage to the fixing drive gear is treated as a cause or a source of the failure of the fixing device 6 of the test image forming apparatus as such damage causes the fixing jam.

Figure 4:
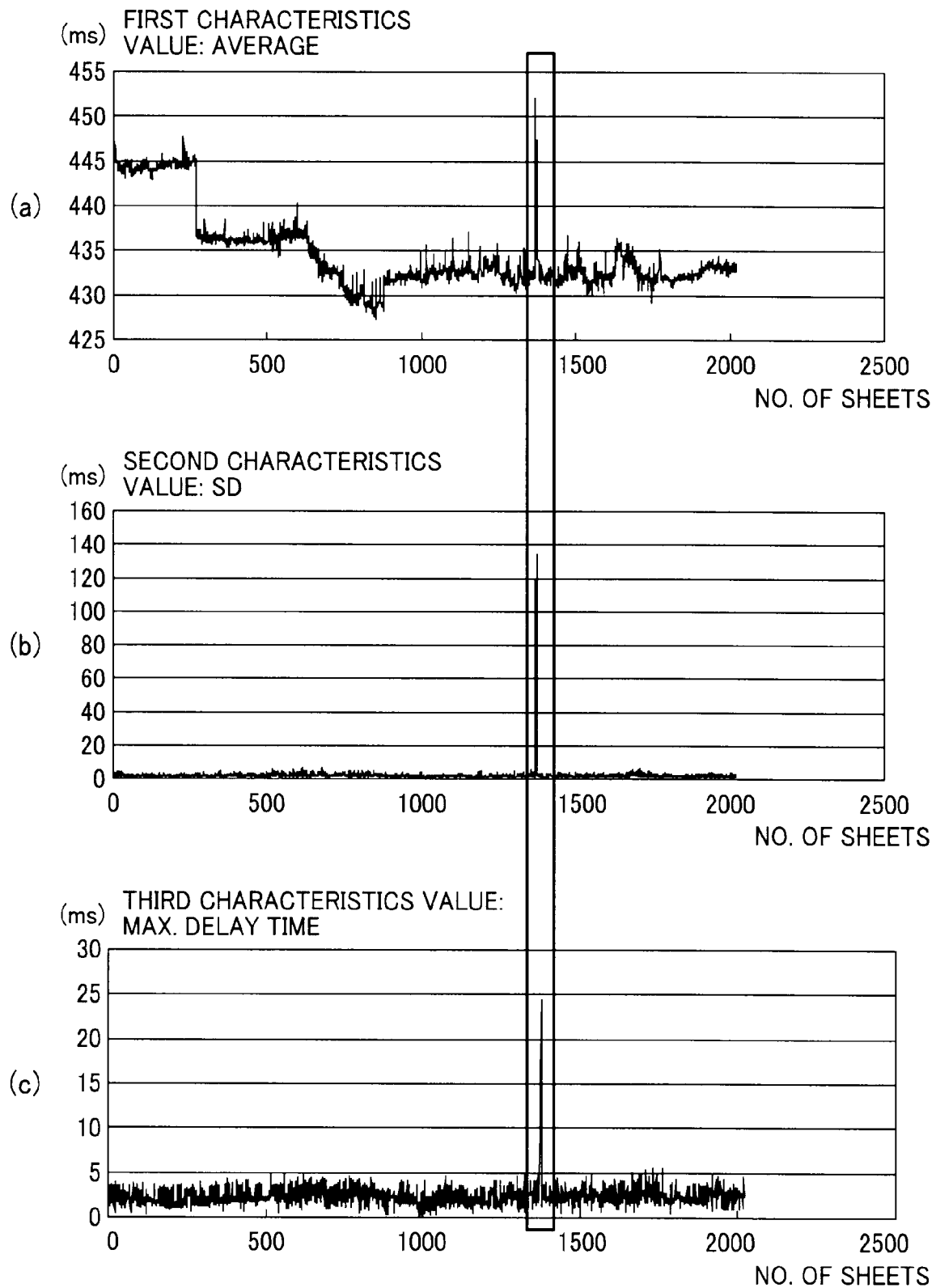
FIG. 4 is an illustration showing the trend in first, second, and third characteristics values obtained by the failure prediction apparatus of FIG. 1 over time.

FIG. 4 illustrates time series data of the first to third characteristics values calculated by the failure prediction apparatus 110 based on a plurality of sheet transfer time values obtained by the test image forming apparatus. In this example, the fixing jam attributable to the damage in fixing driving gear is observed.

Referring to FIG. 4, the horizontal axis indicates the total number of recording sheets that are fixed by the fixing device, expressed in kp (1000 sheets). The number of recording sheets that are fixed may be obtained in various ways, for example, using at least one of the sensors provided in the fixing device, a counter that counts a total number of recording sheets formed with images, a counter that counts a total number of image pixels to be generated, etc.

Referring to FIG. 4, the vertical axis indicates the characteristics value in ms (millisecond). FIG. 4(a) illustrates the average value of the sheet transfer time values, which is the first characteristics value. FIG. 4(b) illustrates the standard deviation of the sheet transfer time values, which is the second characteristics value. FIG. 4(c) illustrates the maximum delay time of the sheet transfer time values, which is the third characteristics value. In order to obtain the first characteristics value, the second characteristics value, and the third characteristics value, the engine 113 obtains the sheet transfer time values respectively correspond to the number of sheets of 1 to 10 kp, and calculates the average value, the standard deviation value, and the maximum delay time using the obtained sheet transfer time values to plot the calculated first to third characteristics values in a corresponding manner with the number of sheets of 1 kp. In a substantially similar manner, the engine 113 obtains the sheet transfer time values respectively for the number of sheets of 2 to 11 kp, and calculates the average value, the standard deviation value, and the maximum delay time using the obtained sheet transfer time values to plot the calculated first to third characteristics values in a corresponding manner with the number of sheet of 2 kp. In a substantially similar manner, the engine 113 obtains the sheet transfer time values respectively for the number of sheets of 2000 to 2009 kp, and calculates the average value, the standard deviation value, and the maximum delay time using the obtained sheet transfer time values to plot the calculated first to third characteristics values in a corresponding manner with the number of sheet of 2000 kp. By repeating this operation, all plots are obtained as illustrated in FIGS. 4(a), (b), and (c), which indicate how the first to third characteristics values change over time as more sheets are processed.

As illustrated in FIGS. 4(a), (b), and (c), there is a sharp increase in characteristics value when the number of sheets is around 1370 kp, indicating that the fixing jam attributable to the damage in fixing drive gear is generated. Based on this data, the first to third characteristics values are highly correlated with the failure of the fixing device that is caused by the damage in fixing drive gear.

Further in this example, FIG. 4(a) indicates that a plurality of types of recording sheets S has been processed by the test image forming apparatus. More specifically, in this example, thick paper is used for a time period indicated by the range between the number of sheets of 1 to 200 kp. The medium thickness paper is used for a time period indicated by the range between a time starting around the number of sheets of 200 to 600 kp and a time ending around the number of sheets of 900 kp. The thin paper is used for a time period indicated by the range between a time starting around the number of sheets of 600 kp and a time ending around the number of sheets of 900 to 2000 kp. FIG. 4(a) indicates that the first characteristics value, which is the average value of sheet transfer time values, is changed in a stepwise manner according to characteristics of a recording sheet S such as paper thickness. In contrary, as illustrated in FIGS. 4(b) and 4(c), none of the second and third characteristics values is affected by characteristics of a recording sheet S such as paper thickness. This indicates that it is preferable to use at least one of the second characteristics value and the third characteristics value in addition to the first characteristics value to determine whether the fixing device 6 of the image forming apparatus 100 fails or is most likely to fail.

The condition data sets Ci, which are the characteristics values calculated based on the sheet transfer time values, are respectively used to generate coefficients bi, sgni, and $\alpha$i using Boosting algorithm. The validity of Boosting algorithm is also tested using the obtained coefficients. More specifically, the condition data set C indicating a failure state of the image forming apparatus, such as the data set indicated by the peak in FIG. 4, is randomly classified such that it is included in both of learning data and test data. Accordingly, the learning condition data set C and the test condition data set C are respectively generated.

In order to see an overall time trend in the first to third characteristics values, the first to third characteristics values of the learning condition data set C are plotted in the vertical axis with respect to the accumulated number of sheets formed with images that is plotted in the horizontal axis. Based on this trend, it is determined whether each learning condition data set C shown in the graph belongs to a time period when the fixing device 6 normally operates or a time period when the fixing device 6 fails. The learning condition data set C that belongs to the time period when the fixing device 6 fails is assigned with the Outi value of −1, and the learning condition data set C that belongs to the time period when the fixing device 6 normally operates is assigned with the Outi value of 1. This learning processing using Boosting algorithm is repeated for 100 times, resulting in generation of coefficients b1 to b100, sgn1 to sgn100, and $\alpha$1 to $\alpha$ 100. Further, in this example, 100 different condition data sets are used for the learning process.

Figure 5:
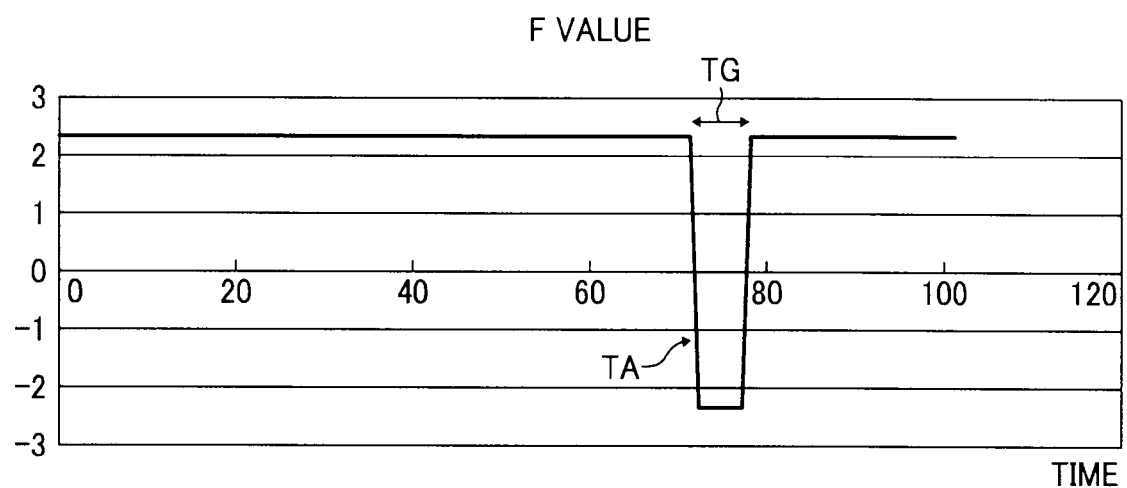
FIG. 5 is an illustration of the correlation between a determination index value calculated by the failure prediction apparatus of FIG. 1 using a learning condition data set and an occurrence of failure predicted in the image forming apparatus of FIG. 1.

FIG. 5 illustrates the determination index value F calculated by the failure prediction apparatus 110 using the coefficients obtained from the learning condition data set C, based on the learning condition data set C. Referring to FIG. 5, the vertical axis indicates the determination index value F, while the horizontal axis indicates time. TG indicates a time period in which the damage to the fixing drive gear occurs, and TA indicates a time when an alarm is generated by the failure prediction apparatus 110.

FIG. 5 indicates that the engine 113 now has the functions of weak learner and weighted majority rule processor, which cause the determination index value F to be negative only when the fixing device is failure state.

The validity of Boosting algorithm, which is the validity of the functions of weak learner and weighted majority rule processor, is tested using the test condition data set C. FIG. 6 illustrates the determination index value F calculated by the failure prediction apparatus 110 using the coefficients obtained from the learning condition data set C, based on the test condition data set C. The test condition data set C is generated in a substantially similar manner as described above in the case of generating the learning condition data set C, for example, using 100 different condition data sets.

Referring to FIG. 6, the determination index value F is changed from positive to negative when the fixing device is failure state ("TG" in FIG. 6), as it is expected. The calculated coefficients bi, sgni, and $\alpha$i are determined to be valid as the resultant determination index value F is able to predict failure of the fixing device based on sheet transfer times obtained from the image forming apparatus.

As described above, the engine 113 is provided with the function of generating the determination index value F using the coefficients bi, sgni, and $\alpha$i, and predicting failure of the fixing device of the image forming apparatus based on the determination index value F. More specifically, the failure prediction apparatus 110 repeatedly calculates and monitors the determination index value F as the image forming apparatus 100 repeatedly performs image forming operation. When the determination index value F is turned to negative, the failure prediction apparatus 110 determines that the fixing device 6 of the image forming apparatus 110 fails or is most likely to fail in the near future, for example, due to the damage caused in fixing drive gear.

Generally, a specific cause or a specific source of the failure of the fixing device is hardly identified, as there are various types of causes or sources that contribute to the fixing operation failure. Because of this complexity, identifying a specific cause or source that leads to the fixing operation failure has been difficult such that it usually takes longer time to identify the cause or source, before the service engineer is able to repair or maintain the image forming apparatus. By applying the above-described technique of calculating the determination index value F, the service engineer at the PC 140 is notified by the failure prediction apparatus 110 when the fixing device 6 of the image forming apparatus 100 fails or is most likely to fail, and what cause such fixing operation failure. Since the service engineer does not have to analyze complex data to identify the specific cause or source of the failure, the overall time it may require for repair or maintenance is greatly reduced.

Further, the sheet transfer time information provided by the image forming apparatus 100 is easily obtained by the image forming apparatus 100 without requiring modification to the structure of the image forming apparatus 100. Using the sheet transfer time information that is easily obtained, and performing relatively simple algorithm such as Boosting algorithm, the failure prediction system is able to predict failure of the fixing device of the image forming apparatus 100 and to obtain detailed information regarding a source of the predicted failure.

For example, in addition or alternative to the damage in fixing drive gear, which is the specific cause or source of the failure, any other type of cause or source of the failure may be taken into account. In such case, different sets of coefficients bi, sgni, and αi are generated respectively for different causes or sources of the failure, and used to calculate determination index values F that respectively correspond to different causes or sources of the failure. In this manner, the failure prediction apparatus 110 is able to predict failure of the fixing device with more accuracy, while providing more detailed information.

Further, the coefficients bi, sgni, and αi may be adjusted such that the determination index value F not only indicates whether the fixing device 6 of the image forming apparatus 100 currently fails, but also indicates whether the fixing device 6 is most likely to fail in the near future. In this specific example, the coefficients bi, sgni, and αi are set such that the failure prediction apparatus 110 generates an alarm prior to the time it is determined that the fixing device 6 fails.

As described above, when it is determined that the fixing device 6 fails or is most likely to fail, the engine 113 specifies the image forming apparatus 100 having the fixing device 6 that is determined to be failure state, and notify the service engineer that the fixing device 6 of the specified image forming apparatus 100 fails or is most likely to fail, for example, by sending an email addressed to the service engineer. Accordingly, the engine 113 functions as an alarm generator. More specifically, when the determination index value F calculated by the engine 113 is turned to negative, as illustrated in FIGS. 5 and 6, the failure prediction apparatus 100 outputs an alarm to notify the service engineer that there is a trouble in the fixing device 6 of the specified image forming apparatus 100 or such trouble is most likely to occur. The failure prediction apparatus 100 may alert the service engineer in various ways, for example, using email, display, sound, etc. For example, the engine 113 may cause the LCD 43 to display an alert message. Alternatively or in addition, the engine 113 may cause any speaker to output a sound to notify the service engineer.

Alternatively, the function of alarm generator may not be performed by the engine 113. For example, the function of alarm generator may be performed by the data collection unit 111 that is provided with the function of communicating with the image forming apparatus 110. For example, the data collection unit 111 may send notification through the Internet 130 to cause any display to display an alert message.

In this example, the failure prediction control program stored in the system controller 114 may be executed by a CPU of the engine 113, or by both of the CPU of the system controller 114 and the engine 113. Further, the failure prediction control program may be stored in any desired memory or medium. Examples of recording medium include, but not limited to, a semiconductor memory such as ROM, nonvolatile memory, optical recording medium such as DVD, MO, MD, or CD-R, magnetic recording medium such as hard disk, magnetic tape, flexible disk, etc. Examples of memory include any desired memory, which may be provided within the failure prediction apparatus 110 or outside the failure prediction apparatus 110. For example, the failure prediction control program may be stored in a hard disk device of a server computer, such as a memory of the PC 140. In such case, the failure prediction apparatus 110 may download the failure prediction control program through the network such as the Internet or LAN for further processing. Further, the above-described operation of predicting failure of the fixing device of the image forming apparatus may be partially or entirely performed by an operating system installed onto the failure prediction apparatus 110 according to a plurality of instructions of the failure prediction control program.

In the above-described example, an operator, such as the service engineer, at the PC 140 may monitor the sheet transfer time information that is stored in the state database 112, and update or maintain the engine 113 of the failure prediction apparatus 110. For example, any one of the functions of the engine 113 may be newly created, edited, or deleted according to the overall trend in the characteristics values obtained from the sheet transfer time information. Further, the state database 112 may collect any other kind of information from the image forming apparatus 100 to generate a different set of coefficients to be used to predict failure of the image forming apparatus 100.

As illustrated in FIG. 1, the failure prediction apparatus 110 is connected to a plurality of image forming apparatuses 100. For each one of the image forming apparatuses 100, the failure prediction apparatus 110 predicts failure of the fixing device 6 of the image forming apparatus 100 by performing the functions of calculating the first to third characteristics values, generating the sheet transfer time information, and obtaining the coefficients bi, sgni, and αi. As described above, any one of these functions of the engine 113 may be updated so as to improve the quality in failure prediction, or to improve the effectiveness in performing failure prediction operation. More specifically, in this example, Boosting algorithm is applied such that the determination result is generated with the high processing speed even when the amount of information stored in the database 112 increases.

Figure 7:
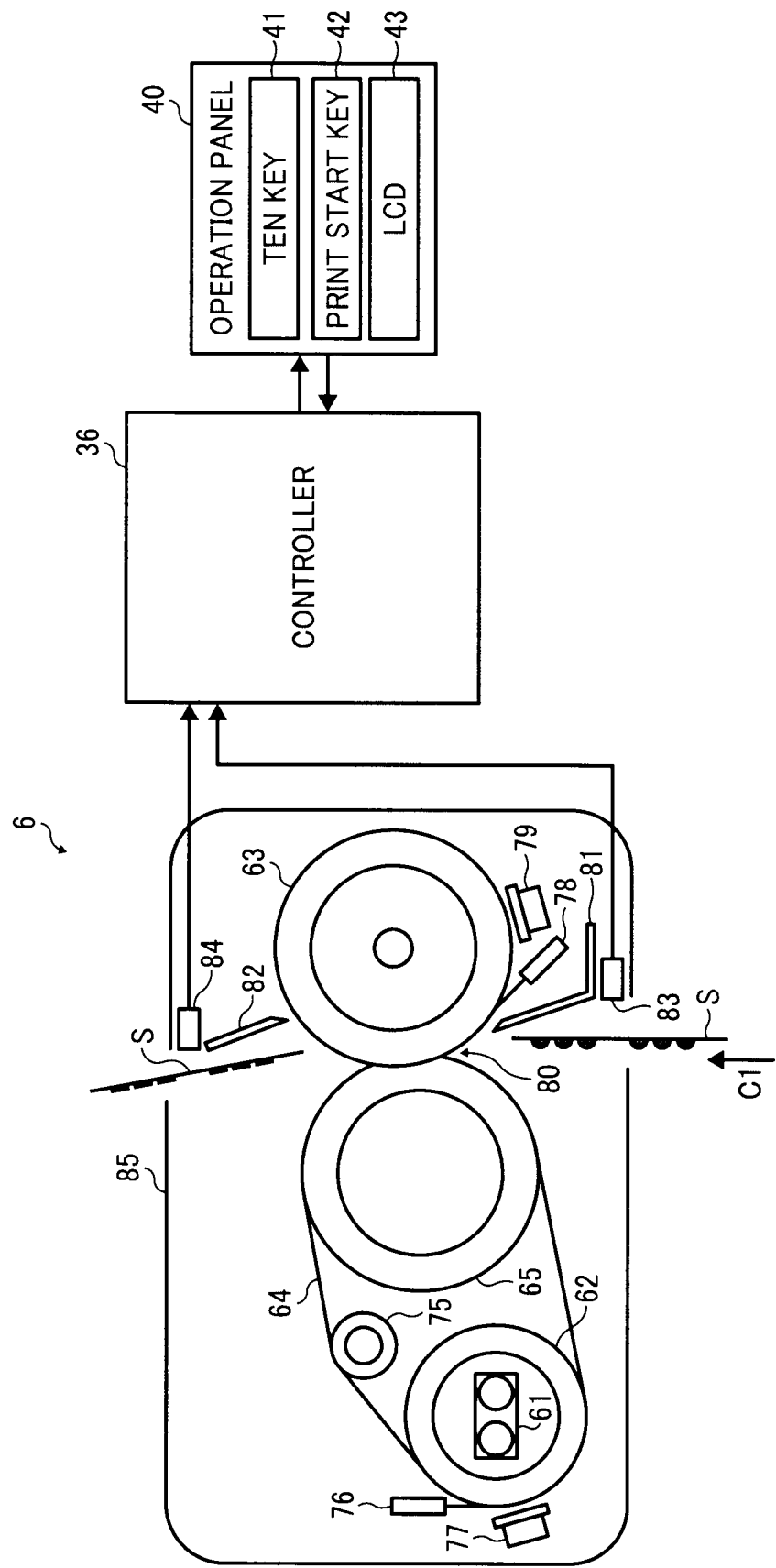
FIG. 7 is a schematic block diagram illustrating a structure of an image forming apparatus provided with a function of failure prediction.

Since failure prediction operation is performed in relatively a small number of steps, the failure prediction operation may be performed by the controller 36 of the image forming apparatus 100. In such case, the image forming apparatus 100 functions as the failure prediction apparatus 110, as illustrated in FIG. 7. Referring to FIG. 7, the controller 36 of the image forming apparatus 100 functions as a first characteristics value calculator, a second characteristics value calculator, a third characteristics value calculator, a state determiner, a pre-determination result calculator, a determination index value calculator, an alarm generator, and a recording medium for storing therein the failure prediction control program. In addition to these functions, the controller 36 is provided with the functions of calculating the sheet transfer time values, obtaining the sheet transfer time values, and storing the sheet transfer time values.

Further, in this example illustrated in FIG. 7, the LCD 43 is caused to display an alert message when the controller 36 determines that the fixing device 6 fails or is most likely to fail. More specifically, when the determination index value F calculated by the controller 36 is turned to negative, as illustrated in FIGS. 5 and 6, the controller 36 causes the LCD 43 to display an alert message indicating that the fixing device 6 fails or is most likely to fail, such as due to the damage in fixing drive gear. With this notification, a user is able to recognize that the fixing device 6 fails or is most likely to fail. In addition or alternative to using the LCD 43, the controller 36 may notify the user in various other ways, for example, by outputting a sound, or sending an email addressed to the service engineer through the LAN 120 or the Internet 130.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, any desired combination of the first, second, and third characteristics values may be used, such as the first characteristics value and at least one of the second and third characteristics values. In one example, only the first and second characteristics values may be used. In addition to the first and second characteristics values, any other characteristics value that is obtained based on the sheet transfer time values may be used. In another example, only the first and third characteristics values may be used. In addition to the first and third characteristics values, any other characteristics value that is obtained based on the sheet transfer time values may be used.

For example, the image forming apparatus 100 may send the sheet transfer time information at any timing. When such information is sent, the sheet transfer time information may be deleted from the memory of the image forming apparatus 100. Further, the image forming apparatus 100 may send the sheet transfer time information to the failure prediction apparatus 110 without storing the sheet transfer time information before sending.

In another example, the fixing device 6 may be provided with a fixing roller in replace of the fixing belt.

In another example, the image forming apparatus 100 may be implemented as a one-drum type image forming apparatus, which forms a full-color toner image by sequentially forming the toner images of respective colors on the surface of the single drum.

In another example, the image forming apparatus 100 may be implemented as a direct transfer type, which directly transfers the toner images of different colors onto the recording sheet S.

In another example, the image forming apparatus may be any desired image forming apparatus as long as it is provided with a fixing device.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

According to one aspect of the present invention, an apparatus for predicting failure of a fixing device of an image forming apparatus is provided. The failure prediction apparatus includes: means for calculating a first characteristics value indicating the average of a plurality of sheet transfer time values of the fixing device; means for calculating a second characteristics value indicating the variance of the plurality of sheet transfer time values of the fixing device; and means for predicting failure of the fixing device, using a determination result generated based on at least the first characteristics value calculated by the means for calculating the first characteristics value and the second characteristics value calculated by the means for calculating the second characteristics value. Since the determination result includes information regarding a source of the failure of the fixing device that is predicted, the service engineer does not have to take time to analyze what causes the failure of the fixing device. Accordingly, the service engineer can easily repair or maintain the image forming apparatus with reduced work load.

The failure prediction apparatus may further include means for calculating a third characteristics value indicating the maximum delay time of the plurality of sheet transfer time values of the fixing device. The means for predicting failure of the fixing device predicts the failure using the third characteristics value in addition to the first and second characteristics value. This further improves the accuracy in predicting failure of the fixing device.

The means for predicting is provided with a weak learner function that calculates a pre-determination result using Boosting algorithm. With the weak learner function, failure prediction is performed with high processing speed.

The means for predicting is further provided with a weighted majority rule processor that calculates a determination index value using the pre-determination result obtained by the weak learner function. With the weighted majority rule processor, failure prediction is performed with improved accuracy.

The determination result generated by the means for predicting failure of the fixing device attributable to a damage in fixing drive gear of the fixing device. Especially when the fixing drive gear is provided outside the fixing unit such that replacement of the fixing drive gear is difficult compared to the other units related to fixing operation that are provided inside the fixing unit, the service engineer is able to recognize whether there is any failure of the fixing device attributable to the damage in fixing drive gear is easily predicted without physically inspecting the fixing drive gear that is not removable from the body of the image forming apparatus.

In order to take into account the damage to the fixing drive gear, a condition data set including the characteristics values that is obtained when such damage is observed is used to define coefficients of the weak learner function and the weighted majority rule processor.

In addition to the damage to the fixing drive gear, any other type of damage may be taken into account such that more than one specific source of the failure of the fixing device is identified.

According to one aspect of the present invention, a method of predicting failure of a fixing device of an image forming apparatus is provided. The failure predicting method includes: calculating a first characteristics value indicating the average of a plurality of sheet transfer time values of the fixing device; calculating a second characteristics value indicating the variance of the plurality of sheet transfer time values of the fixing device; predicting failure of the fixing device, using a determination result generated based on at least the first characteristics value and the second characteristics value. Since the determination result includes information regarding a source of the failure of the fixing device that is predicted, the service engineer does not have to take time to analyze what causes the failure of the fixing device. Accordingly, the service engineer can easily repair or maintain the image forming apparatus with reduced work load.

According to one aspect of the present invention, a recording medium storing a plurality of instructions which cause a processor to perform the above-described method is provided. The plurality of instructions that are stored in the recording medium may be downloaded in any desired manner onto any desired apparatus including, for example, a computer, an image forming apparatus, a portable device, etc.

According to one aspect of the present invention, an apparatus for predicting failure of a fixing device of an image forming apparatus is provided, which includes: a data collection unit to obtain a plurality of sheet transfer time values each indicating a time taken for a recording sheet to be transferred through the fixing device of the image forming apparatus; a controller unit to calculate a characteristics value based on the plurality of sheet transfer time values, and to predict failure of the fixing device of the image forming apparatus using a determination result generated based on the characteristics value, the determination result including information regarding a source of the failure that is predicted.

In this example, the controller unit generates a pre-determination result using a weak learner of Boosting algorithm, and the determination result is generated by applying weighted majority algorithm to the pre-determination result.

The weak learner of Boosting algorithm is generated based on a plurality of data items each corresponding to a specific component of the fixing device of the image forming apparatus that may cause failure of the fixing device when it is damaged. For example, the specific component of the fixing device is a fixing drive gear of the fixing device that may cause a fixing operation trouble when it is damaged.

Further, in the above-described example, the above-described method of predicting failure performed by the weak learner function and the weighted majority rule processor function is applied to predict failure of the fixing device of the image forming apparatus. Alternatively, the above-described method of predicting failure may be applied to any other device provided in the image forming apparatus based on desired data that is collected from the image forming apparatus.

What is claimed is:

1. An apparatus for predicting failure of a fixing device of an image forming apparatus, the apparatus comprising:
   a data collection unit configured to obtain a plurality of sheet transfer time values each indicating a time starting from when a recording sheet enters the fixing device to when the recording sheet exits the fixing device of the image forming apparatus;
   a controller unit configured to:
     calculate a first characteristics value that is an average value of the plurality of sheet transfer time values stored in a sheet transfer time storage unit, a second characteristics value that indicates the variance of the plurality of sheet transfer time values stored in the sheet transfer time storage unit, and a third characteristics value that indicates a maximum delay time among the plurality of sheet transfer time values stored in the sheet transfer time storage unit;
     generate a plurality of condition data sets each including the first characteristics value, the second characteristics value and the third characteristics value for a predetermined period of time;
     calculate a pre-determination result for each condition data set by applying a first weight to each condition data set;
     calculate a determination index value by applying a second weight to each pre-determination result and summing each pre-determination result; and
     predict failure of the fixing device of the image forming apparatus based on a comparison of the determination index value to a predetermined value, the comparison result including information regarding whether a fixing drive gear of the fixing device is damaged,
     wherein at least one of the first weight and second weight are based on the source of the failure.

2. The apparatus of claim 1, wherein the controller unit generates the pre-determination result using a weak learner of a boosting algorithm.

3. The apparatus of claim 2, wherein the determination result is generated by applying a weighted majority algorithm to the pre-determination result.

4. The apparatus of claim 3, wherein the weak learner of the boosting algorithm is generated based on data collected when a fixing drive gear of the fixing device is damaged.

5. The apparatus of claim 1, wherein the transfer time values each indicate a time starting from when a leading edge of the recording sheet enters the fixing device to when the leading edge of the recording sheet exits the fixing device.

6. The apparatus of claim 1, wherein the determination result is a weighted combination of the plurality of data sets.

7. The apparatus of claim 1, wherein the pre-determination result for each condition data set is calculated based on a threshold regarding each characteristics value and a determination polarity of each characteristics value.

8. The apparatus of claim 1, wherein both the first weight and second weight are based on the source of the failure.

9. The apparatus of claim 1, wherein the controller unit predicts the failure of the fixing device in part by determining a correlation between the third characteristics value and at least one of the first characteristics value and second characteristics value.

10. A system comprising:
    a fixing device configured to fix a toner image onto a recording sheet;
    a data collection unit configured to obtain a plurality of sheet transfer time values each indicating a time starting from when a recording sheet enters the fixing device to when the recording sheet exits the fixing device;
    a controller unit configured to:
      calculate a first characteristics value that is an average value of the plurality of sheet transfer time values stored in a sheet transfer time storage unit, a second characteristics value that indicates the variance of the plurality of sheet transfer time values stored in the sheet transfer time storage unit, and a third characteristics value that indicates a maximum delay time among the plurality of sheet transfer time values stored in the sheet transfer time storage unit;
      generate a plurality of condition data sets each including the first characteristics value, the second characteristics value and the third characteristics value for a predetermined period of time;
      calculate a pre-determination result for each condition data set by applying a first weight to each condition data set;
      calculate a determination index value by applying a second weight to each pre-determination result and summing each pre-determination result; and
      predict failure of the fixing device based on a comparison of the determination index value to a predetermined value, the comparison result including information regarding whether a fixing drive gear of the fixing device is damaged,
      wherein at least one of the first weight and second weight are based on the source of the failure.

11. The system of claim 10, wherein the fixing device includes a fixing unit having a plurality of components accommodated in one case, and the fixing drive gear is provided outside of the fixing unit.

12. The system of claim 10, wherein the controller unit is incorporated into an image forming apparatus provided with the fixing device.

13. A method of predicting failure of a fixing device of an image forming apparatus, the method comprising:
- obtaining a plurality of sheet transfer time values each indicating a time starting from when a recording sheet enters the fixing device to when the recording sheet exits the fixing device of the image forming apparatus;
- calculating a first characteristics value that is an average value of the plurality of sheet transfer time values stored in a sheet transfer time storage unit, a second characteristics value that indicates the variance of the plurality of sheet transfer time values stored in the sheet transfer time storage unit, and a third characteristics value that indicates a maximum delay time among the plurality of sheet transfer time values;
- generating a plurality of condition data sets each including the first characteristics value, the second characteristics value and the third characteristics value for a predetermined period of time;
- calculating a pre-determination result for each condition data set by applying a first weight to each condition data set;
- calculating a determination index value by applying a second weight to each pre-determination result and summing each pre-determination result; and
- predicting failure of the fixing device of the image forming apparatus based on a comparison of the determination index value to a predetermined value, the comparison result including information regarding whether a fixing drive gear of the fixing device is damaged,
- wherein at least one of the first weight and second weight are based on the source of the failure.

* * * * *